R. D. BROWN.
Harvester Rake.
No. 56,521. Patented July 24, 1866.
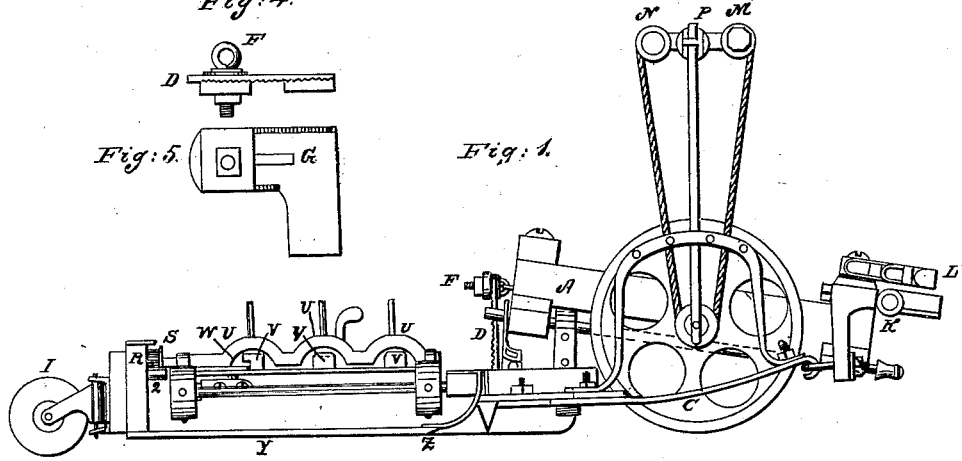
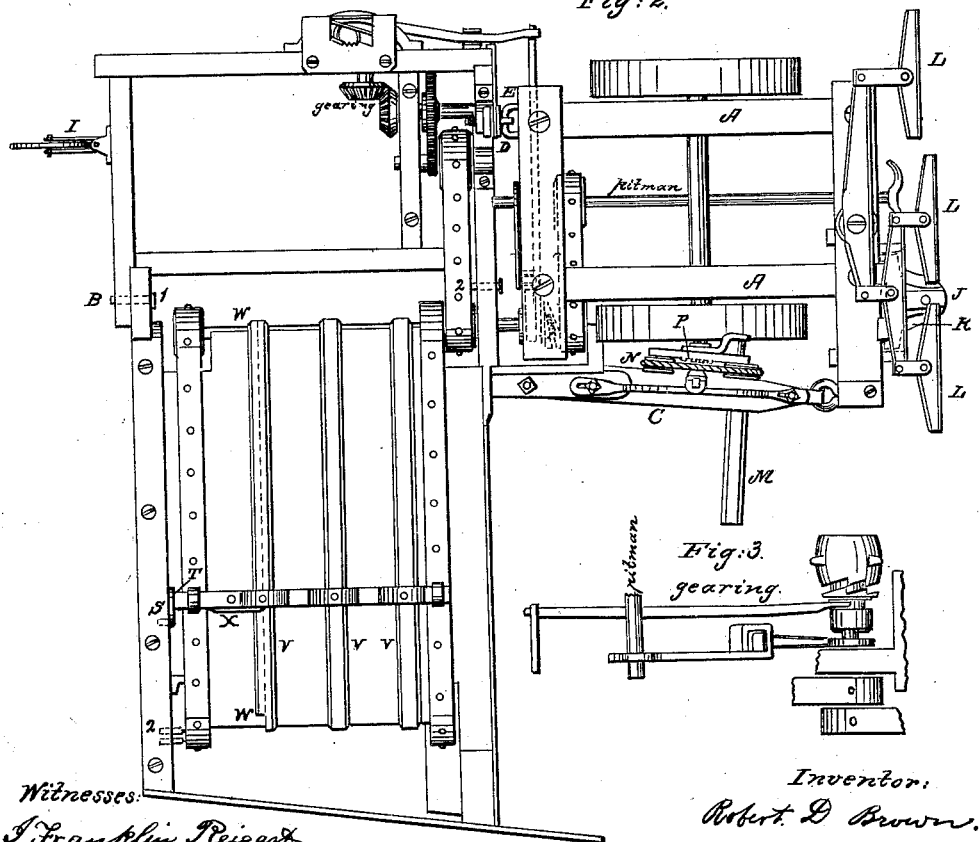

UNITED STATES PATENT OFFICE.

R. D. BROWN, OF COVINGTON, INDIANA.

IMPROVEMENT IN HARVESTER-RAKES.

Specification forming part of Letters Patent No. 56,521, dated July 24, 1866.

*To all whom it may concern:*

Be it known that I, R. D. BROWN, of Covington, Fountain county, and State of Indiana, have invented new and useful Improvements in Rakers and Platforms of Harvesters; and I do hereby declare the following to be an exact description thereof, reference being had to the accompanying drawings, and to the letters of reference marked thereon, making a part of this specification, of which—

Figure 1 represents a side elevation of the machine; Fig. 2, a top view. Fig. 3 shows the devices for throwing the machine in or out of gear. Figs. 4 and 5 represent the adjustable bolt and ratchet that regulates the height of the binder-platform with the carriage according to the unevenness of the ground.

The nature of my invention consists, first, in the arrangement, as hereinafter described, of a pin or fork that turns the rake as it passes from the bottom to the top of the platform; second, the arrangement and combination of the ratchet and pulley with the reel for the purpose of tightening the belt.

A represents the frame of the carriage; B, the frame of the platform; C, the drag-bar that connects the carriage-frame and platform at one side, and D the ratchet-plate that connects the carriage-frame and platform on the opposite side. The one end of plate D is fastened permanently to the front corner of platform, and the other end of plate is held to the carriage-frame by a link, E, and ring F, being the head of adjustable bolt operating in a vertical slot, G, tightened on the opposite end, and braced by the nut H against the ratchet-teeth of the plate D, which serves to adjust the platform to any desired height, assists in drawing the binder-platform being attached to the outside corner, counteracts the side draft, and gives to the movement of the machine the advantage of conforming to the irregularity of the ground without strain or injury to the working devices. The caster I, being located in the rear of and fastened to the binder-frame B², also assists in carrying the additional weight of platform B, and keeps the platform in a relative position with the carriage in front, while the loose tongue J in front of the carriage keeps its draft and position regular and properly balanced, so that the tongue is never thrown too high or too low, as is usually the case over uneven surfaces, but moves in conformity with the floating platform. The tongue J is so constructed as to work loosely or stiff by screwing two screws through the movable tongue-plate K to the frame of the carriage to stiffen the tongue when it is necessary to use the reaper as a mower. I also use three single-trees, L L L, for the purpose of attaching three horses to give an easier and surer draft.

The reel M works on one end of an arm and a loose pulley, N, on the other end, with a ratchet, P, between, so that the pulley N may take up all the slack and allow the reel to be adjusted back or forward, up or down, without having to splice or take out a piece of the belt or chain.

Q is a pin that projects at the front end of the slot R, and is forked so as turn the wrist S of the crank T over and throw the wrist in the slot above for the purpose of turning the rake U with the longest possible teeth without striking the bottom of the platform. This could not be accomplished with the endless slot, as in giving it the proper shape to give this motion to the rake the wrist would come so far above the center that it would come to a dead-lock.

In one of the ribs, V, of the platform is a groove, W, that a projection, X, from the rake enters as the rake turns upward, and keeps the rake and teeth upright, and prevents the rake from turning back when the pressure of the grain on the platform bears against the rake.

I attach the bottom boards Y to the cutting-bar frame in front by pointing the boards and inserting and fitting them in a groove, Z, and screw the back ends of the boards fast to the rear frame of the platform. This keeps the boards firm and smooth and prevents their splintering at their front ends.

With regard to the gearing devices, as shown at Figs. 2 and 6, I do not wish to confine my mode of driving the gearing devices by cog-gearing or connecting the pitman with the center of the carriage-axle, as I purpose connecting with the outer end of the carriage-axle, either by a common shaft and bevel-gearing or by belt and pulleys, as I find best.

What I claim as my invention, and desire to secure by Letters Patent, is—

1. The arrangement of the forked pin Q at the end of the slot R, as herein described, and for the purposes set forth.

2. The arrangement and combination of the ratchet P and pulley N with the reel M, for the purpose of tightening the belt, as herein described.

R. D. BROWN.

Witnesses:
   JAMES CRAIG,
   S. E. WATSON.